United States Patent
Kraus

(10) Patent No.: US 9,178,628 B2
(45) Date of Patent: Nov. 3, 2015

(54) METHOD AND APPARATUS FOR GRAPHIC DISPLAY OF I/Q VALUES OF A BASEBAND SIGNAL

(71) Applicant: Rohde & Schwarz GmbH & Co. KG, Munich (DE)

(72) Inventor: Jochen Kraus, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 14/455,890

(22) Filed: Aug. 9, 2014

(65) Prior Publication Data

US 2015/0049796 A1    Feb. 19, 2015

(30) Foreign Application Priority Data

Aug. 16, 2013    (DE) .......................... 10 2013 216 300

(51) Int. Cl.
*H04B 3/46* (2015.01)
*H04B 17/00* (2015.01)
*H04B 17/23* (2015.01)

(52) U.S. Cl.
CPC ............ *H04B 17/0042* (2013.01); *H04B 17/23* (2015.01)

(58) Field of Classification Search
CPC ........... H04B 17/0065; H04B 17/0042; G01R 13/345; G01R 13/0254
USPC .......... 375/228, 224, 227, 295; 600/443, 444, 600/455
See application file for complete search history.

(56) References Cited

U.S. PATENT DOCUMENTS

| | | | |
|---|---|---|---|
| 5,539,772 A * | 7/1996 | Fasulo et al. .................. | 375/224 |
| 6,417,834 B1 | 7/2002 | Balz | |
| 2004/0184554 A1 * | 9/2004 | Pauly et al. .................... | 375/295 |
| 2005/0071099 A1 | 3/2005 | Balz | |

FOREIGN PATENT DOCUMENTS

| | | |
|---|---|---|
| DE | 19547896 A1 | 7/1997 |
| DE | 10161602 A1 | 6/2003 |

OTHER PUBLICATIONS

Agelent Technologies, "Successful Modulation Analysis in 3 Steps—89600B Vector Signal Analysis Software", Application Note 5990-6997EN, 2010, Agilent Technologies, 2010.
Schenk, "Grobkarolinefeld—High Frequency Test Equipment", Kriebel-Tour 2010, KWS-Electronic GmbH, 2010.

* cited by examiner

*Primary Examiner* — Khai Tran
(74) *Attorney, Agent, or Firm* — Potomac Technology Law, LLC

(57) ABSTRACT

An approach for the graphic display of I/Q values of a baseband signal by means of a constellation diagram is provided. The approach comprises: selecting a subset of I/Q values from a set of I/Q values of a baseband signal, wherein the non-selected I/Q values of the set form a non-selected subset; calculating a frequency of occurrence of each I/Q value of the selected subset; assigning display information to each I/Q value of the selected subset, wherein the display information at least corresponds to the respective frequency of occurrence; and displaying, on a display device, the set of I/Q values of the baseband signal in a constellation diagram, based at least in part on the display information, wherein the I/Q values of the non-selected subset is displayed in a different manner from the I/Q values of the selected subset.

20 Claims, 6 Drawing Sheets

METHOD AND APPARATUS FOR GRAPHIC DISPLAY OF I/Q VALUES OF A BASEBAND SIGNAL

CROSS-REFERENCE TO RELATED APPLICATION(S)

The present application claims priority to German Patent Application No. DE102013216300.2 (filed Aug. 16, 2013) the entirety of which is incorporated herein by reference.

BACKGROUND

The present invention relates to a method and a device for the automatic graphic display of I/Q values of a baseband signal by means of a constellation diagram.

A constellation diagram serves for the graphic display of received symbols of a digitally modulated signal. Typically, the signals arriving in a receiver are evaluated for this purpose on the basis of preamble information of the signal, wherein the respective modulation type, the bit-depth per symbol, the signal source and other information can be contained in the preamble of the signal. Alternatively, this information is obtained from especially reserved subcarriers, for example, the Transmission Parameter Signaling, abbreviated as TPS in the Digital Video Broadcast standard DVB-T. As an alternative, the information is simply specified in a fixed manner for each standard, so that a receiver handles the received digital signals according to this fixed specification.

The assigned symbols obtained from the received signal in this manner represent complex numbers in this context. A symbol can thus be displayed as a point in the complex I/Q plane—the constellation diagram. The real part of the symbol is designated as the In-Phase component, abbreviated as I. The imaginary part of the symbol is designated as the Quadrature-Phase component, abbreviated as Q.

For the transmission of information, digital signals are transmitted on a high-frequency carrier by varying the magnitude and the phase of the carrier in such a manner that the carrier adopts one of several specific constellation points in the constellation diagram at every clock transition. Every constellation point codes a given symbol which comprises one or more data bits. In this context, a constellation diagram shows the valid constellations for all permitted symbols. In order to obtain the respective symbol, the precise magnitude and the precise phase of the received signal must be determined for every clock transition.

Dependent upon the modulation method used, a constellation diagram comprises a different number of decision fields. A decision field is an area in the constellation diagram in which one constellation point is disposed in each case. The decision fields are often drawn as a grid in the diagram in order to obtain a visual demarcation of the individual constellation points from one another.

In this context, a signal transmission can be subject to different disturbances. Reference is made here, for example, to the error-vector measurement, the I/Q phase error over time, the I/Q amplitude inequalities, the carrier suppression, the phase jitter, the sinusoidal interference and the deterioration of the signal-noise ratios, wherein this list is not exhaustive.

If disturbances occur in the transmission path, the actual constellation points of a symbol deviate from the associated ideal constellation point of the symbol within a decision field dependent upon the size of the disturbance on the signal. A so-called signal cloud occurs around the ideal constellation points. The smaller the signal cloud of a constellation point is, the less disturbed the received signal is. The larger the signal cloud of a constellation point is, the more disturbances the received signal has been subjected to. Clearly visually organized constellation diagrams are required in order to find and remove these disturbances in the transmission path in investigations of the signal path.

An arrangement with which an I/Q value is displayed for a predetermined registration time as a pixel on a display element is described in DE 195 47 896 A1. For each I/Q value, a frequency of occurrence is determined in order to implement error calculations.

The problem with such an approach is that, with relatively high orders of modulation, very visually disorganized diagrams are obtained. With relatively large disturbances, signal clouds occur which intrude into the decision fields of other constellation points. As a result of this intrusion, different constellation points are confused with one another thereby enormously complicating an error analysis because it is no longer possible to assign an I/Q value to the respective constellation point.

With currently available transmission methods, such as Digital Video Broadcast, especially with the more recent standard DVB-C2 or DVB-T2, it is also problematic that the constellation points of all subcarriers of several symbols in time sequence, also designated as cells, are superposed in the constellation diagram. In the case of signals with a broad bandwidth, these different subcarriers may be disturbed differently, because the transmission channel varies over such a broad frequency range. Furthermore, each of the symbols can, in principle, be modulated differently, so that a differentiation of the symbols in the constellation diagram becomes impossible.

Furthermore, different symbols typically belong to different datastreams, wherein, for an investigation of the signal, only one datastream may optionally be relevant.

Furthermore, different symbols, especially OFDM symbols, within one transmission frame, also designated as a frame, serve different purposes. For instance, a symbol can be a preamble frame, a data frame or an end frame.

In order to implement an accurate error analysis to determine the largest interfering influence, an improved display is necessary.

Consequently there is a need for an approach for the display of constellation diagrams, in which clear visual organization is enhanced, and wherein an increased computational effort should be avoided, and an error analysis should be improved.

SOME EXAMPLE EMBODIMENTS

Embodiments of the present invention advantageously address the foregoing requirements and needs, as well as others, by providing an approach for the display of constellation diagrams, in which clear visual organization is enhanced, and wherein such an approach avoids increased computational effort, and improves error analysis. By way of example, methods for the automatic graphic display of I/Q values of a baseband signal are provided by means of a constellation diagram.

According to example embodiments, the method comprises: selecting a subset of I/Q values from a set of I/Q values of a baseband signal, wherein the non-selected I/Q values of the set form a non-selected subset; calculating a frequency of occurrence of each I/Q value of the selected subset; assigning display information to each I/Q value of the selected subset, wherein the display information at least corresponds to the respective frequency of occurrence; and displaying, on a display device, the set of I/Q values of the baseband signal in a constellation diagram, based at least in part on the display information, wherein the I/Q values of the non-selected subset is displayed in a different manner from the I/Q values of the selected subset.

The selection, according to such embodiments, of a subgroup of I/Q values from all I/Q values of the baseband signal allows a reduction of N value groups down to only two value groups, namely a selected subgroup and a non-selected subgroup. As a result of this unambiguous assignment, a more clearly visually organized display is possible. The display is therefore unambiguous under all circumstances and in all configurations, if the I/Q values of the selected subgroup are always permitted to cover the I/Q values of the non-selected I/Q values. Further, none of the I/Q values of the selected subgroup is concealed or covered.

By way of example, the non-selected subset of I/Q values is displayed independently of their frequency of distribution and/or with a relatively lower resolution. The non-selected subgroup is of subordinate interest, so that a detailed display is not required, thereby strongly reducing the computational effort. The method also has the advantage that only the selected subset of I/Q values needs to be taken into consideration for the calculation of frequencies of occurrence. Accordingly, the computational intensity is reduced, wherein an intensity-related display of the selected I/Q values dependent upon their frequencies of occurrence is retained in full. Especially with regard to the definition of different symbols, for example, from different modulations or signal sources, on the same constellation point, it is possible to select through a pre-selection, so that it is immediately recognizable, with reference to the display information, which of the different symbols provides a relatively larger disturbance.

Further, the method according to such an embodiment is compatible with previous display variants. It can be used with all standards and is not a specially adapted solution. Accordingly, very complex transmission methods can be analyzed very well through a corresponding selection, especially, the coded orthogonal frequency multiplex method, abbreviated as Coded-OFDM, which is used as a basis for a series of transmission standards, for example, audio standards, such as DAB, video standards, such as DVB-T2 or DVB-C2, the mobile-radio standard LTE, or communications standards, such as WLAN or Bluetooth 3.0.

According to further embodiments, the display information is a color value, a contrast value and/or a brightness value. In this context, the individual I/Q values are displayed with a different color or with different contrasts, for example, dependent upon the frequency of occurrence. This embodiment advantageously ensures that very clearly visually organized constellation diagrams are obtained, allowing the maximum possible evaluations in the constellation diagram as a result of the visual distinctness. A multi-stage subdivision based on threshold values for the respective frequency of occurrence of the I/Q value is advantageous. Color gradations in different colors, for example, green, for rare frequencies of occurrence, yellow for medium frequencies of occurrence and red for high frequencies of occurrence, are particularly suitable in order to achieve good visual distinctness of the individual I/Q symbols.

In accordance with one embodiment, the step of calculating the frequencies of occurrence is implemented by means of a counter. In this context, it is registered in a data buffer how often a specific I/Q value—which preferably displays a pixel in the display—has been received. The counter status is then compared with the threshold value used for the respective frequency of occurrence in order to assign a corresponding display information whenever a threshold value is exceeded. Accordingly, the number of threshold values is adjustable so that a user can specify in which gradations of frequency of occurrence the I/Q value is to be displayed for each constellation point. In this context, the individual threshold values for the frequency-of-occurrence values are advantageously adjustable by the user, so that the user can adapt the threshold values, and especially their data volume, to the respective baseband signal to be investigated.

By way of further example, the I/Q values of the selected subgroup always cover the I/Q values of the non-selected subgroup, which ensures that the selected I/Q values are displayed in every case and not concealed and/or covered by a non-selected I/Q value.

By way of further example, the display information of the I/Q values of the non-selected set of all I/Q values is identical, which has the advantage that all non-selected I/Q values are displayed in an identical manner. Accordingly, the user is provided with an intuitive visualization of which I/Q values have not been selected in the constellation diagram.

According to further embodiments, the step of selection is advantageously implemented by the user. By way of example, the user is requested to make a user entry, where, especially during the demodulation of a received signal, preamble information is evaluated, thereby providing information about which I/Q values are, in principle, present in the baseband signal. By way of further example, through the preamble information, it is possible to select between pilot symbols, header symbols and data symbols. By way of further example, the preamble can also contain information about different datastreams transmitted in parallel. In this context, the selection need not necessarily be based upon preamble information. For example, if reserved subcarriers are used for the transmission of the selection criteria, the selection should be based on the subcarrier information, especially the "Transmission Parameter Signaling". Alternatively, the information is predefined according to a standard and can be used directly for the selection.

According to one embodiment, the frequency of occurrence for every selected I/Q value is stored with the respective I/Q value itself. In this manner, a uniform data record is created, which represents both the I/Q value and also the display information and the frequencies of occurrence, which allows a simple buffer management.

According to further embodiments, the step of selection is implemented on the basis of a specific modulation used for the transmission of the I/Q values and different modulation types are imaged in the constellation diagram. The resulting decision fields are correspondingly small because of the plurality of constellation points through modulations of a relatively high order or use of different modulations, so that disturbances in the signal path and a resulting enlarged signal cloud of a constellation point occurs. By way of example, in order to distinguish the signal cloud of the constellation point of a modulation from a signal cloud of another constellation point, only a subset of I/Q values of a specific modulation is selected in order to implement an unambiguous assignment of the I/Q values. Further, it is also conceivable to image two different modulation types at one constellation point. A simple visualization is thus possible, which facilitates an analysis as to which modulation type provides the greatest interfering influence.

According to one embodiment, the selection is implemented on the basis of a specific symbol of the baseband signal. Accordingly, this refers, for example, to specific groups and/or classes of OFDM symbols, which is particularly advantageous if several specific symbols define the same constellation point in the constellation diagram. By way of example, by selecting a specific symbol, I/Q values of only this symbol are displayed, thereby simplifying the error analysis.

According to a further embodiment, the selection is implemented on the basis of a specific signal source of the baseband signal. By way of example, a signal transmission is used with currently available standards simultaneously for different signal sources. Further, in order to make statements about the interference of a specific signal source, a specific signal source is selected according to the invention in the constellation diagram.

According to a further embodiment, the selection is implemented on the basis of specific subcarriers and/or portions of a signal, for example, of an OFDM signal. By way of example, in the case of broadband signals, frequency-dependent disturbances of the transmission channel can be determined in this manner.

According to a further embodiment, the selection is implemented on the basis of specific symbols of a transmission frame, for example, only of the preambles, only of the transmission-frame header or only of the transmission-frame end. By way of example, in the case of large transmission frames of a signal, frame-dependent disturbances of the transmission channel can be determined in this manner.

In accordance with further embodiments of the present invention, a device for the graphic display of I/Q values of a baseband signal is similarly provided. According to such embodiments, the device includes a selection unit configured to select a subset of I/Q values from a set of I/Q values of a baseband signal, wherein the non-selected I/Q values of the set form a non-selected subset. The device further includes a calculation unit configured to calculate a frequency of occurrence of each I/Q value of the selected subset. The device further includes an assignment unit configured to assign display information to each I/Q value of the selected subset, wherein the display information at least corresponds to the respective frequency of occurrence. The device further includes a data buffer configured to store at least the selected subset of I/Q values, wherein the frequency of occurrence for each I/Q value of the selected subset is stored with the respective I/Q value. The device further includes a display unit configured to display the set of I/Q values of the baseband signal in a constellation diagram, based at least in part on the display information, wherein the I/Q values of the non-selected subset is displayed in a different manner from the I/Q values of the selected subset. Accordingly, through the selection of a subset of I/Q values, the computational effort is considerably minimized, and the clear visual organization of the display is enhanced.

According to one embodiment, the I/Q values of the non-selected set provide an identical display information.

According to a further embodiment, the display information provides a subset indicator, which, for example, comprises a 1-bit information that displays whether an I/Q value is a part of the selected subset or not. Accordingly, with this low technical effort for each I/Q value, it is easily possible to distinguish between a selected and a non-selected I/Q value. For example, the calculation unit and the assignment unit can be simply controlled in this manner.

By way of example, the display information is a color information of the pixel representing the I/Q value. By way of further example, the display information is a contrast information of the pixel of the display unit representing the I/Q value.

According to a further embodiment, the display information of the selected subset is different from the display information of the non-selected set of I/Q values. By way of example, all I/Q values of the non-selected set are provided with an identical display information.

Accordingly, with such a device and methods according to example embodiments of the present invention, it is possible, through a selection, to separate the symbols connected to an identical constellation point from one another, in order to make a statement about the error-susceptibility of this constellation point with regard to these special symbols. By selecting the subset, the method saves computational time and enhances the clarity of visual organization.

BRIEF DESCRIPTION OF THE DRAWINGS

These and other features, aspects and advantages of the present invention will become better understood with regard to the following description, appended claims and accompanying drawings. Identical components in the drawings are provided with the same reference numbers. The drawings should not be seen as true to scale, individual elements in the drawings may have been drawn in an increased scale or respectively with increased simplification. Accordingly, embodiments of the present invention are illustrated by way of example, and not by way of limitation, in the figures of the accompanying, in which:

DETAILED DESCRIPTION

Methods and devices for the display of constellation diagrams, whereby clear visual organization is enhanced, and whereby increased computational effort is avoided and error analysis is improved, wherein, for example, the automatic graphic display of I/Q values of a baseband signal are provided by means of a constellation diagram, are described. In the following description, for the purposes of explanation, numerous specific details are set forth in order to provide a thorough understanding of the invention. It is apparent, however, that embodiments of the invention may be practiced without these specific details or with an equivalent arrangement. In other instances, well known structures and devices are shown in block diagram form in order to avoid unnecessarily obscuring the invention.

Figure 1:
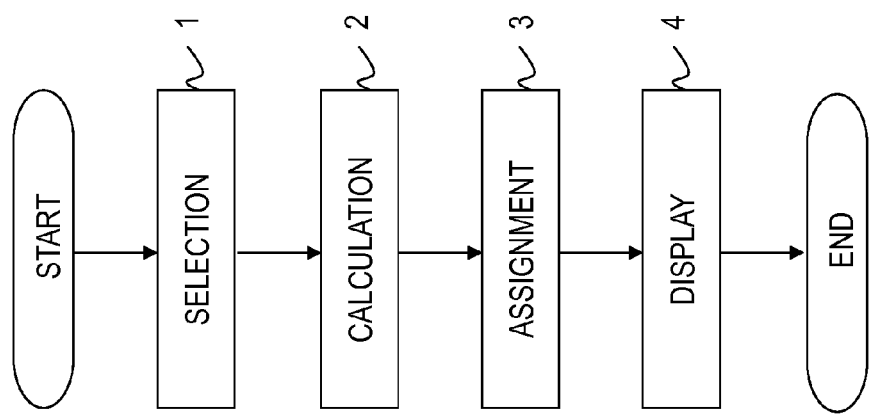
FIG. 1 illustrates a flow chart depicting a method for the display of constellation diagrams, in accordance with example embodiments of the present invention.

FIG. 1 illustrates a flow chart depicting a method for the display of constellation diagrams, in accordance with example embodiments of the present invention. In a selection step 1, a subset of I/Q values of a baseband signal is selected. According to the calculation step 2, a calculation of the frequency of occurrence 10, 11, 12 of the respective I/Q value is implemented on the basis of the selected subset of these I/Q values. In an assignment step 3, a display information is assigned to every selected I/Q value on the basis of the frequency of occurrence 10, 11, 12. In the final display step 4, the selected I/Q value with the display information is displayed on a display element in a constellation diagram 5.

As a result of calculating the frequency of occurrence only for the selected subset of I/Q values, a considerable part of the computational effort can be saved. The display is therefore obtained more rapidly and a real-time evaluation is made possible. By selecting a subset of I/Q values, the visual organization of the constellation diagram 5 is considerably enhanced and an improved error analysis is possible in the case of disturbances in the transmission path of a message signal.

Figure 2:
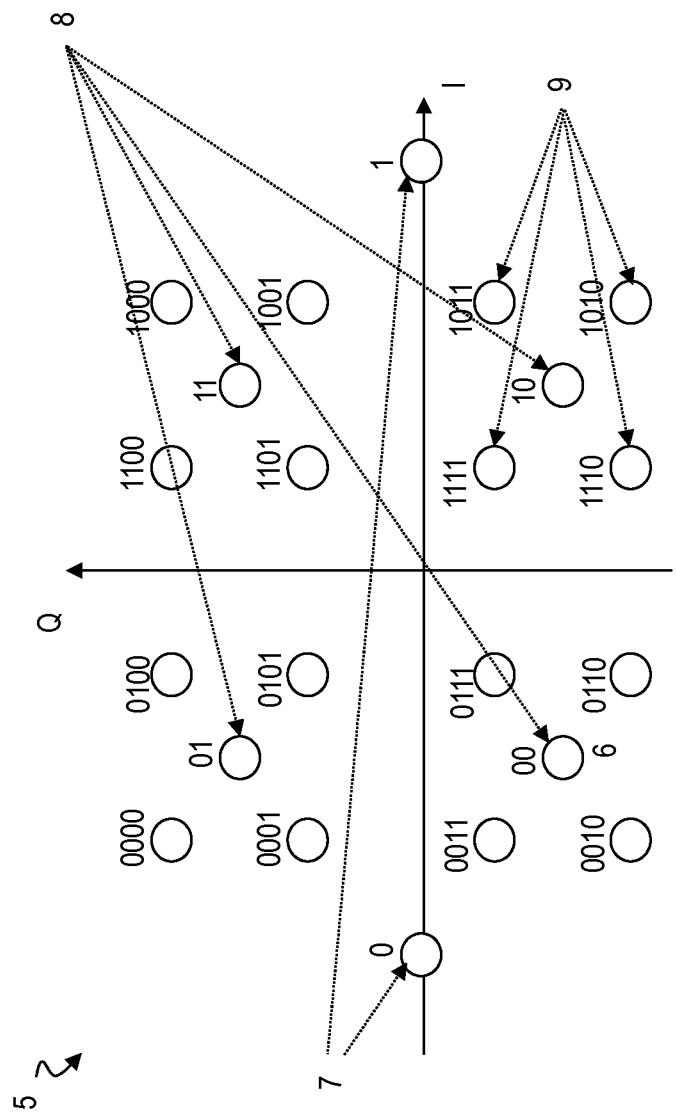
FIG. 2 illustrates a constellation diagram with constellation points of different modulation types.

FIG. 2 illustrates a constellation diagram 5, with constellation points of different modulation types, in accordance with example embodiments of the present invention. The constellation diagram 5 shows a complex I/Q plane, wherein the real part of a complex symbol present in the baseband is displayed on the I axis, and the imaginary part of the complex symbol is displayed on the Q axis. The complex symbols are entered corresponding to their modulation at the respective constellation point 6 of the constellation diagram 5.

In this context, the constellation diagram 5 according to FIG. 2 comprises a baseband signal with complex symbols for three different modulation types. Accordingly, a first modulation 7 is, for example, a 2 BPSK modulation. The constellation points of this first modulation 7 are disposed on the axis of the constellation diagram 5 and are used especially for the transmission of pilot symbols, since only the phase of the complex symbols varies through +/−180°, and a high probability of detection and robustness of these constellation points is present.

Furthermore, a 4-QPSK is shown in the constellation diagram 5 according to FIG. 2 as a second modulation 8, wherein QPSK is an abbreviation for Quadrature Phase Shift Keying. Accordingly, only one constellation point 6 of the second modulation 8 is arranged in every quadrant of the constellation diagram 5, which also leads to a simple detectability of the constellation point and to a corresponding robustness in the signal path susceptible to interference. The QPSK is thus characterized in that the amplitudes of the individual constellation points carry no information, since all of the symbols provide the same spacing distance relative to the zero point.

Furthermore, the constellation diagram 5 provides a third modulation 9, for example, a 16-fold quadrature amplitude modulation, abbreviated as 16-QAM. In this context, four symbols are provided in each quadrant of the constellation diagram 5, so that this third modulation is more susceptible to interference. In the case of the third modulation, decision errors based on disturbances in the signal path can lead to incorrect assignments in the constellation diagram 5.

It is problematic with such a constellation diagram 5 as shown in FIG. 2, if the disturbances in the signal path of the signal cause the signal clouds of the constellation point 6 to spread into the decision fields of another constellation point, confusing the signal clouds, for example, in the case of a phase jitter, the reduction of the signal-noise ratio or other disturbing influences. A separation of the individual I/Q values with regard to the respective constellation point 6 is then no longer possible. An error analysis is then no longer possible.

Similarly, a 4-QAM could be accommodated in the constellation diagram 5 as a fourth modulation. The constellation points of the 4-QAM would then be identical to the constellation points of the modulation 8, namely, the 4-QPSK. A possibility for selection has been created according to the invention in order to distinguish the individual symbols of the 4-QAM from the signals of the 4-QPSK.

Similarly, first symbols can be accommodated in the constellation diagram 5 with the 16-QAM as the third modulation 9 alongside second symbols of the 16-QAM as the third modulation 9 in the constellation diagram 5. A possibility for selection was created according to the invention in order to distinguish the first symbols from the second symbols of the 16-QAM.

Figure 3:
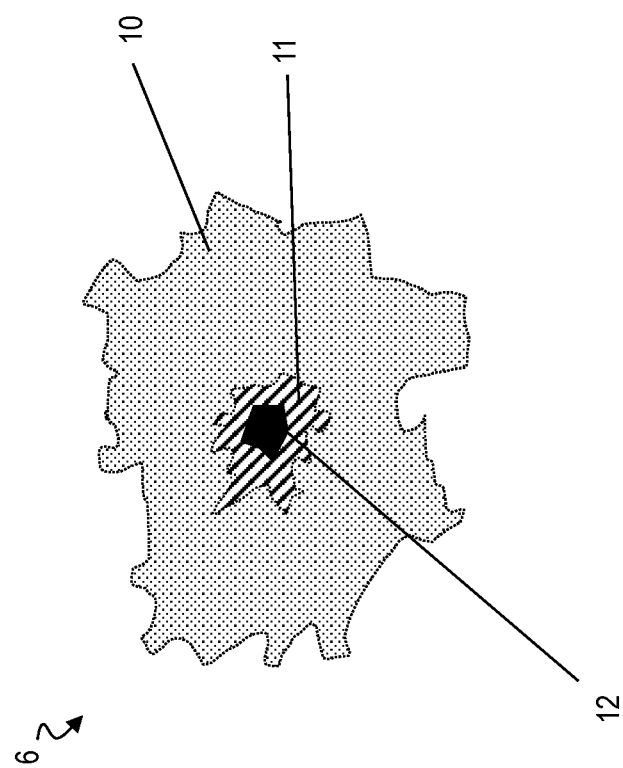
FIG. 3 illustrates an enlargement of a specific constellation point (point 6) of the constellation diagram of FIG. 2.

FIG. 3 illustrates an enlargement of a specific constellation point (point 6) of the constellation diagram of FIG. 2. In this context, the signal status 00 of the 4-QPSK modulation 8 according to FIG. 2 has been enlarged in the display. In order to make a statement about the frequency of occurrence of an I/Q value, this constellation point 6 provides three different frequency-of-occurrence thresholds. Accordingly, a first frequency of occurrence of the I/Q value with reference number 10 is shown. A second frequency of occurrence of the I/Q value is presented with reference number 11, and a third frequency of occurrence of an I/Q value is shown with reference number 12.

The individual I/Q values are displayed as pixels on the display element 17. A calculation unit 15 calculates the frequency of occurrence with which an I/Q value occurs. For this purpose, a counter may be used, for example, which determines the number of I/Q values occurring and increments a counter value whenever the I/Q value has again been detected another time. On the basis of adjustable threshold values, a display information is assigned to every frequency of occurrence of an I/Q value.

A three-stage display information has proved particularly good with regard to visual perception. From a given threshold value, a corresponding display information is assigned to the I/Q value. In this context, the display information can be a color information, a contrast value and/or a brightness value. The display information can also be a texture information, a pattern information and/or hatching information.

Accordingly, I/Q values with a high frequency of occurrence 12 are displayed, for example, as red pixels. I/Q values with a medium frequency of occurrence 11 are displayed, for example, as yellow pixels. I/Q values with a low frequency of occurrence 10 are displayed, for example, as green pixels. In particular, a three-stage threshold-value scale is selected for the frequency of occurrence in order to achieve the maximum possible visual significance with the assistance of a display information of only 2 bits in size.

In this context, the relative frequency of occurrence of the respective I/Q value is calculated, that is to say, the frequency of occurrence of the respective I/Q value relative to the total number of I/Q values of this constellation point in the constellation diagram 5.

According to example embodiments of the present invention, the number of frequency-of-occurrence thresholds is not restricting. For example, only one threshold is provided in order to separate the I/Q values of the selected subgroup from the I/Q values of the non-selected subgroup. Alternatively, the frequency of occurrence is displayed in a multi-stage manner, for example, 10-stage or 15-stage.

As an alternative, the frequency of occurrence is displayed by means of a continuous color-characteristic scale. The value of the frequency of occurrence counter could be used directly in this manner.

Figure 4:
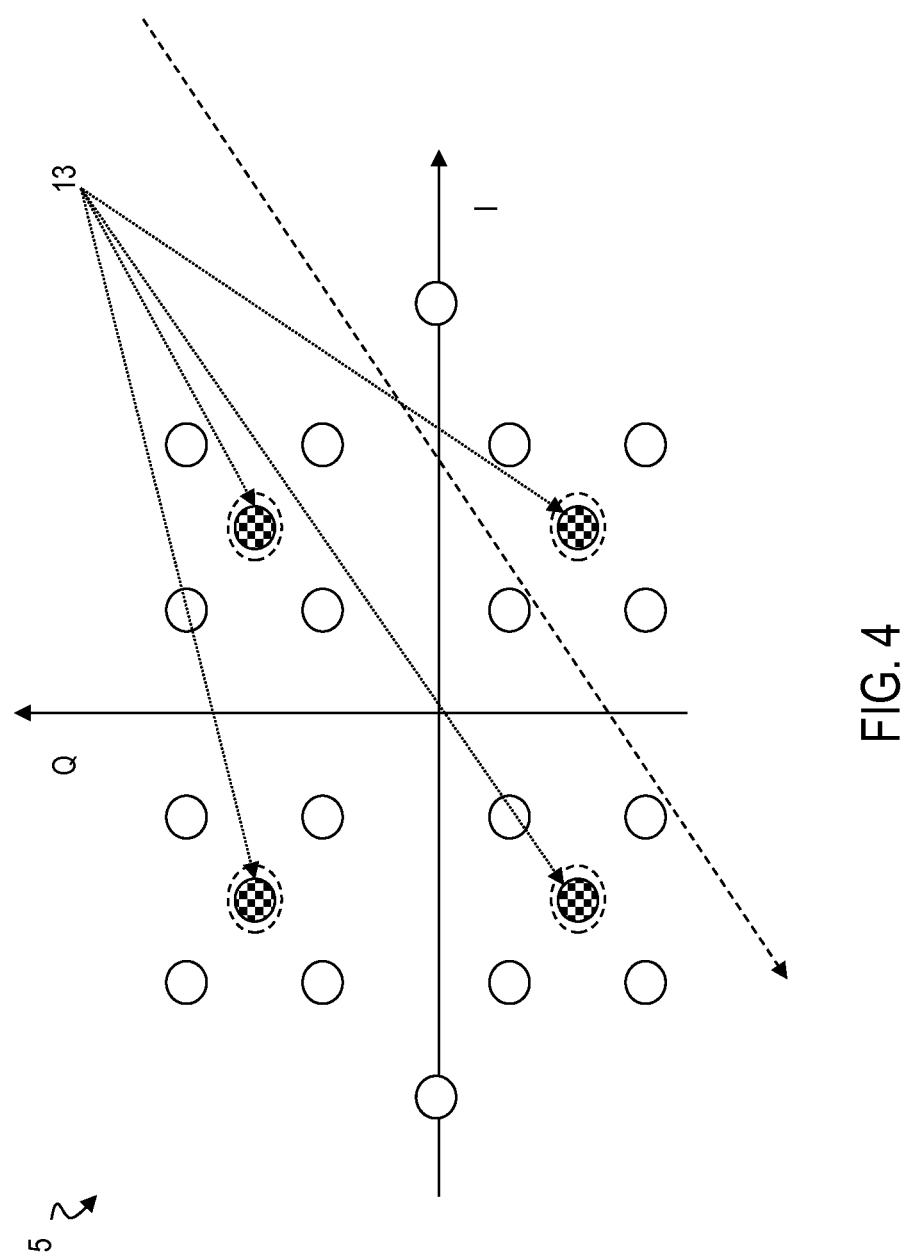
FIG. 4 illustrates a constellation diagram with a selected subset of I/Q values, in accordance with example embodiments of the present invention.

FIG. 4 illustrates a constellation diagram with a selected subset (13) of I/Q values, in accordance with example embodiments of the present invention. With reference to FIG. 4, the second modulation 8 has been displayed as a selected subset 13 of I/Q values with a distribution of frequencies of occurrence. The other constellation points 6 of the constellation diagram 5 are presented in a uniform display, wherein, for example, a uniform grey tone or a uniform contrast setting should be selected. Accordingly, the user of the constellation diagram 5 is offered a simple possibility for displaying in color only those I/Q values which are relevant for an error analysis, starting from an abundance of I/Q values.

The dashed lines in FIG. 4 show that the selected constellation points 6 of the subset 13 can also include non-selected I/Q values, especially with the use of different symbols on the same constellation point 6 and a selection of only one of the different symbols. Alternatively, a 4-QAM could also be displayed with a 4-QPSK together in a constellation diagram 5, wherein the I/Q values of the 4-QAM or the 4-QPSK can be displayed separated from one another through an appropriate selection.

Figure 5:
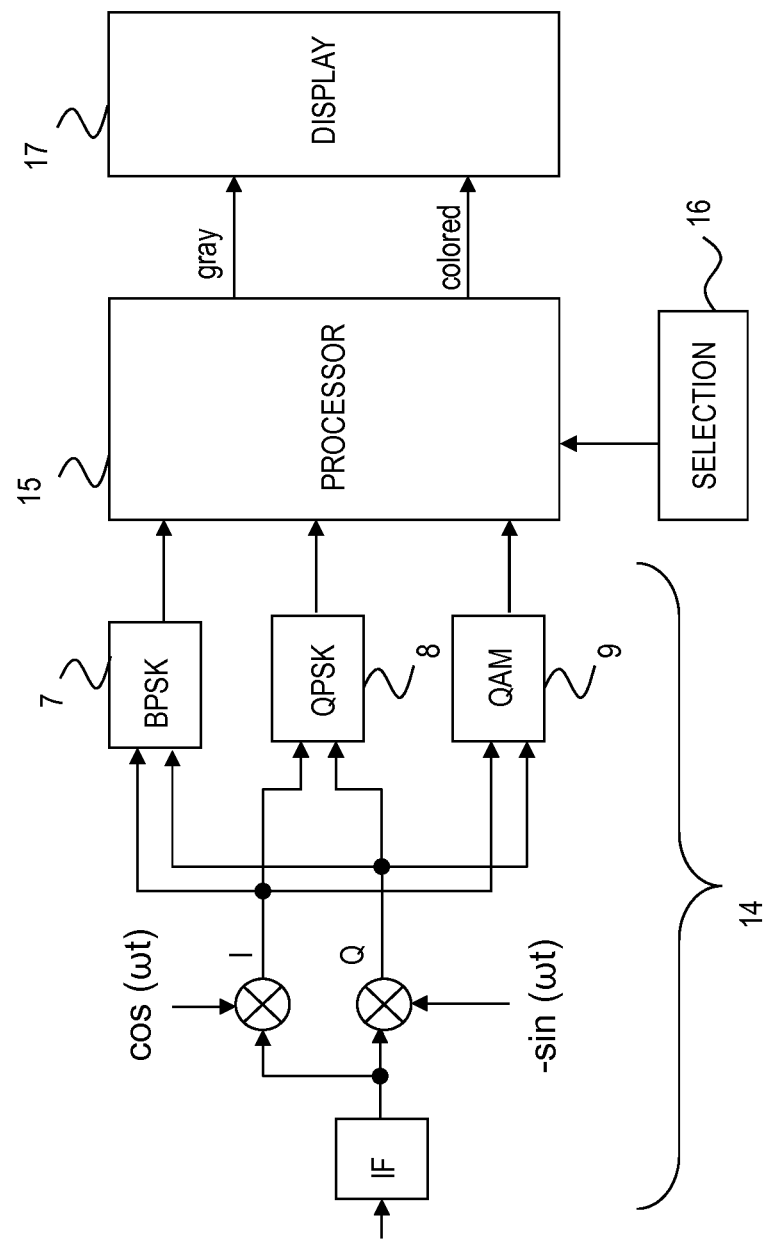
FIG. 5 illustrates a block diagram depicting an example device for the display of constellation diagrams, in accordance with example embodiments of the present invention.

FIG. 5 illustrates a block diagram depicting an example device for the display of constellation diagrams, in accordance with example embodiments of the present invention. A demodulation unit 14 provides a quadrature modulator typical for I/Q-based baseband signals, wherein an intermediate frequency IF is multiplied using two carrier waves displaced by 90°. In this context, for example, a $\cos(\omega t)$ carrier frequency is used to obtain the IN-phase component of the I/Q value 6. Conversely, for example, a $-\sin(\omega t)$ carrier frequency is used to obtain the QUADRATURE-phase component of the I/Q value 6.

The resulting in-phase and quadrature-phase components of a constellation point 6 are now presented to a calculation unit 15 corresponding to their modulation 7, 8, 9. In this context, it is shown to the calculation unit 15 which I/Q values should be displayed with a frequency of occurrence 10, 11, 12. For this purpose, a selection unit 16 is provided. The calculation unit 15 presents the selected and the non-selected I/Q values to a display 17, wherein the selected I/Q values are displayed with a display information not equal to the display information of the non-selected I/Q values of the display 17.

As an alternative, and not illustrated in FIG. 5, the selection is implemented on the basis of a transmission frame of the signal, so that, a selection is made, for example, between the preamble frame, the data frame, the frame end or the frame header, in order to provide a statement regarding the susceptibility of different frames to interference in the transmission.

Alternatively, the selection is made on the basis of specific subcarriers in order to investigate, especially, the frequency dependence of broadband signals.

Figure 6:
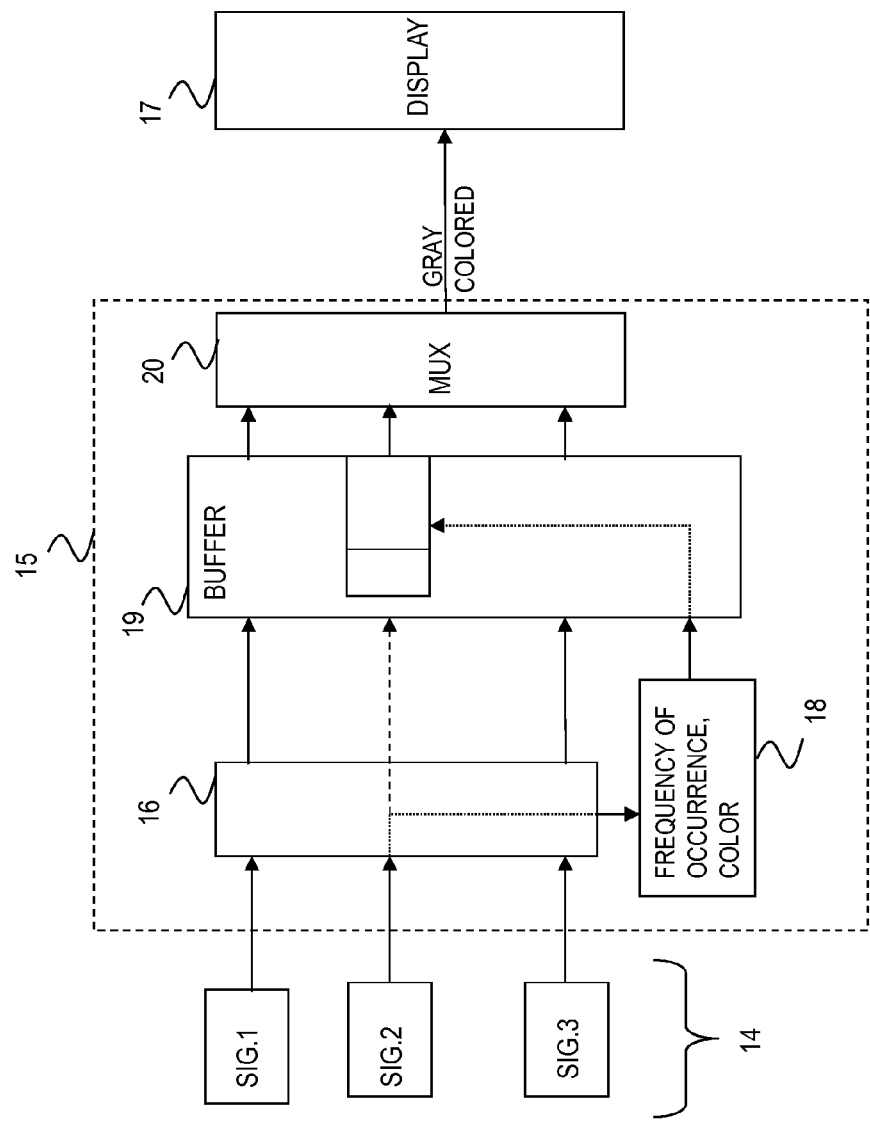
FIG. 6 illustrates a block diagram depicting an alternative example device for the display of constellation diagrams, in accordance with example embodiments of the present invention.

FIG. 6 illustrates a block diagram depicting an alternative example device for the display of constellation diagrams, in accordance with example embodiments of the present invention. For example, the modulation 7, 8, 9 is not used as the selection criterion here, but one of the three different signal sources. In the present example, according to FIG. 6, a selection unit 16, which is controlled, for example, by the user, selects the signal source 2 as the signal source of which the I/Q values are to be displayed with a frequency of occurrence 10, 11, 12. The associated I/Q values according to signal source 2 are calculated by means of an assignment unit 18 corresponding to their frequencies of occurrence 10, 11, 12. Corresponding to the frequencies of occurrence 10, 11, 12, in the assignment unit 18, display information, especially a color tone or a contrast value, are assigned to the respective I/Q value. In this context, the assigned display information is based upon a previously calculated frequency of occurrence 10, 11, 12. The I/Q value is stored with the display information in a data buffer 19. Accordingly, the I/Q value itself with the respective display information is stored in the data buffer 19. In order to display a constellation diagram 5 by means of a multiplexer 20, the I/Q values of the signal sources 1 and 3 are rerouted to the display unit (Display) 17 with the display information provided according to signal source 2.

The display unit 17 displays a pixel corresponding to the I/Q values which are stored in the buffer 19 with the display information linked to them. Accordingly, an associated address in the buffer 19 is read out for a pixel of the display unit 17. The address in the buffer 19 then comprises the I/Q value and the associated display information. The display can be time-limited, wherein a counter status associated with the pixel address is incremented within a predetermined time span, in each case whenever a further I/Q value has been determined for this address via the calculation unit 15, and accordingly a respective pixel has been determined on the display element 17. In this manner, the frequency of occurrence with which this address and the associated pixels occur is stored under every address of the data buffer 19. The display information is assigned to the frequency of occurrence by means of an assignment unit 18.

For the transmission of the color distribution, 3 bits are used for each pixel. In this context, a first bit is used as the subset indicator in order to show that the I/Q value belongs to a selected subset 13. The two further bits contain the display information, especially a color tone based upon the three-stage threshold value. The I/Q value is displayed on the basis of three colors. The three colors can be adjusted by the user. The default setting of the colors is selected in such a manner that the rare values are visually emphasized, that is, that a strong contrast for these I/Q values is given.

The respective constellation points 6 can also be frozen, wherein the constellation diagram 5 is not updated from the time of the so-called freeze setting. However, the calculation of the I/Q values is continued in the background. This freezing can be adjusted via an operating button of the device.

Alternatively or additionally, a holding is possible, wherein an infinite data collection is activated as a result.

Since very high modulation orders, constellation points 6 used in a multiple manner and different signal sources can serve as a basis for an I/Q value in many broadcast standards (radio standards), a selection is made according to the invention in order to allow an error analysis. This means that only selected subcarriers or symbol types appear in the color of the frequency of occurrence, while all non-selected I/Q values are displayed without intensity distribution.

By preference, only one symbol type may be displayed in color. A change between the individual subsets of the I/Q values of the baseband signal is also provided. All of the elements described and/or illustrated and/or claimed can be combined arbitrarily with one another within the scope of the invention. In particular, the device and method features can be combined arbitrarily with one another.

The foregoing description of various example embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method comprising:
    selecting a subset of I/Q values from a set of I/Q values of a baseband signal, wherein the non-selected I/Q values of the set form a non-selected subset;
    calculating a frequency of occurrence of each I/Q value of the selected subset;
    assigning display information to each I/Q value of the selected subset, wherein the display information at least corresponds to the respective frequency of occurrence; and
    displaying, on a display device, the set of I/Q values of the baseband signal in a constellation diagram, based at least in part on the display information, wherein the I/Q values of the non-selected subset is displayed in a different manner from the I/Q values of the selected subset.

2. The method according to claim 1, wherein the display information assigned each I/Q value of the selected subset comprises one or more of a color value, a contrast value and a brightness value of one or more display pixels corresponding to the respective I/Q value.

3. The method according to claim 1, further comprising:
    assigning display information to each I/Q value of the non-selected subset, wherein the display information for each of the I/Q values of the non-selected subset is the same.

4. The method according to claim 1, wherein each of the I/Q values of the non-selected subset is one or more of displayed independently of a respective frequency of occurrence and displayed with a relatively lower resolution.

5. The method according to claim 1, wherein the frequency of occurrence for each I/Q value of the selected subset is stored with the respective I/Q value.

6. The method according to claim 1, wherein the selection of the subset of I/Q values is based at least in part on a modulation associated with the I/Q values.

7. The method according to claim 1, wherein the selection of the subset of I/Q values is based at least in part on a symbol.

8. The method according to claim 1, wherein the selection of the subset of I/Q values is based at least in part on a signal source.

9. The method according to claim 1, wherein the selection of the subset of I/Q values is based at least in part on one or more of a subcarrier and a transmission frame.

10. The method according to claim 1, wherein the display information is assigned to each I/Q value of the selected subset based at least in part on a threshold value of the respective frequency of occurrence.

11. An apparatus comprising:
    a selection unit configured to select a subset of I/Q values from a set of I/Q values of a baseband signal, wherein the non-selected I/Q values of the set form a non-selected subset;
    a calculation unit configured to calculate a frequency of occurrence of each I/Q value of the selected subset;
    an assignment unit configured to assign display information to each I/Q value of the selected subset, wherein the display information at least corresponds to the respective frequency of occurrence;
    a display unit configured to display the set of I/Q values of the baseband signal in a constellation diagram, based at least in part on the display information, wherein the I/Q values of the non-selected subset is displayed in a different manner from the I/Q values of the selected subset.

12. The apparatus according to claim 11, wherein the display information assigned each I/Q value of the selected subset comprises one or more of a color value, a contrast value and a brightness value of one or more display pixels corresponding to the respective I/Q value.

13. The apparatus according to claim 11, wherein the assignment unit is further configured to assign display information to each I/Q value of the non-selected subset, wherein the display information for each of the I/Q values of the non-selected subset is the same.

14. The apparatus according to claim 13, wherein the display information of the selected subset of I/Q values is different from the display information of the non-selected subset of I/Q values.

15. The apparatus according to claim 11, further comprising:
    a data buffer configured to store at least the selected subset of I/Q values, wherein the frequency of occurrence for each I/Q value of the selected subset is stored with the respective I/Q value.

16. The apparatus according to claim 11, wherein the selection of the subset of I/Q values is based at least in part on a modulation associated with the I/Q values.

17. The apparatus according to claim 11, wherein the selection of the subset of I/Q values is based at least in part on a symbol.

18. The apparatus according to claim 11, wherein the selection of the subset of I/Q values is based at least in part on a signal source.

19. The apparatus according to claim 11, wherein the selection of the subset of I/Q values is based at least in part on one or more of a subcarrier and a transmission frame.

20. The apparatus according to claim 11, wherein the display information is assigned to each I/Q value of the selected subset based at least in part on a threshold value of the respective frequency of occurrence.

* * * * *